(12) United States Patent
Yamashita

(10) Patent No.: US 8,260,031 B2
(45) Date of Patent: Sep. 4, 2012

(54) PATTERN INSPECTION APPARATUS, PATTERN INSPECTION METHOD, AND COMPUTER-READABLE RECORDING MEDIUM STORING A PROGRAM

(75) Inventor: Kyoji Yamashita, Kanagawa (JP)

(73) Assignees: Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 831 days.

(21) Appl. No.: 12/347,345

(22) Filed: Dec. 31, 2008

(65) Prior Publication Data

US 2009/0238441 A1 Sep. 24, 2009

(30) Foreign Application Priority Data

Mar. 18, 2008 (JP) ................... 2008-068921

(51) Int. Cl.
*G06K 9/00* (2006.01)
(52) U.S. Cl. ........................ 382/144; 382/145
(58) Field of Classification Search .................. 382/141, 382/144, 145–152, 232; 356/237.1, 239.1, 356/239.3, 239.7, 239.8, 237.2–237.6
See application file for complete search history.

(56) References Cited

U.S. PATENT DOCUMENTS

| | | | | |
|---|---|---|---|---|
| 5,960,106 A * | 9/1999 | Tsuchiya et al. | .............. | 382/144 |
| 6,578,188 B1 * | 6/2003 | Pang et al. | ....................... | 716/52 |
| 6,865,288 B1 * | 3/2005 | Shishido et al. | .............. | 382/145 |
| 7,271,891 B1 * | 9/2007 | Xiong et al. | ................ | 356/237.4 |
| 2008/0025625 A1 * | 1/2008 | Ishizaka | ......................... | 382/248 |
| 2008/0260235 A1 * | 10/2008 | Cai et al. | ........................ | 382/144 |

FOREIGN PATENT DOCUMENTS

| | | |
|---|---|---|
| JP | 5-281155 | 10/1993 |
| JP | 2005-338666 | 12/2005 |
| JP | 2007-72232 | 3/2007 |
| JP | 2007-102153 | 4/2007 |
| JP | 2007-183135 | 7/2007 |

* cited by examiner

*Primary Examiner* — Tarifur Chowdhury
*Assistant Examiner* — Michael P LaPage
(74) *Attorney, Agent, or Firm* — Oblon, Spivak, McClelland, Maier & Neustadt, L.L.P.

(57) ABSTRACT

A pattern inspection apparatus includes a magnification conversion unit to convert first sample optical image data to higher resolution second sample optical image data, a low-pass filter configured to filter first design image data which has a resolution N times that of the first sample optical image data, an optical filter which calculates third design image data by convolving the second design image data with an optical model function, a coefficient acquisition unit configured to acquire a coefficient of the predetermined optical model function using the second sample optical image data and the third design image data, an optical image acquisition unit configured to acquire actual optical image data of an inspection target workpiece, a reference image data generation unit configured to generate reference image data corresponding to the actual optical image data, and a comparison unit configured to compare the actual optical image data with the reference image data.

2 Claims, 12 Drawing Sheets

PATTERN INSPECTION APPARATUS, PATTERN INSPECTION METHOD, AND COMPUTER-READABLE RECORDING MEDIUM STORING A PROGRAM

CROSS-REFERENCE TO RELATED APPLICATION

This application is based upon and claims the benefit of priority from the prior Japanese Patent Application No. 2008-068921 filed on Mar. 18, 2008 in Japan, the entire contents of which are incorporated herein by reference.

BACKGROUND OF THE INVENTION

1. Field of the Invention

The present invention relates to a pattern inspection apparatus, a pattern inspection method, or a program for causing a computer to execute the method. For example, it relates to a pattern inspection technique for inspecting a pattern defect of an object serving as a target workpiece used for semiconductor manufacture, and to an apparatus for inspecting a defect of an extremely small pattern, such as a photomask, a wafer, or a liquid crystal substrate, used when manufacturing a semiconductor element or a liquid crystal display (LCD) and an inspection method thereof.

2. Description of Related Art

In recent years, with an increase in high integration and large capacity of large-scale integrated (LSI) circuits, a circuit line width required for semiconductor elements is becoming narrower and narrower. These semiconductor elements are manufactured by exposing and transferring a pattern onto a wafer to form a circuit by means of a reduced projection exposure apparatus, known as a stepper, while using a master or "original" pattern (also called a mask or a reticle, and hereinafter generically referred to as a mask) with a circuit pattern formed thereon. Therefore, in order to manufacture a mask for transfer printing a fine circuit pattern onto a wafer, an electron beam pattern writing apparatus capable of writing or "drawing" fine circuit patterns needs to be employed. The pattern circuits may be directly written onto a wafer by the pattern writing apparatus. They are written using electron beams or laser beams, for example.

Since a lot of manufacturing cost is needed for the production of LSI, an improvement in yield is a crucial issue. However, as typified by a DRAM (Dynamic Random Access Memory) of 1 giga-bit class, the order of a pattern constituting the LSI has been changing from submicron to nano-meter. Then, one of major factors that decrease the yield is a pattern defect of a mask used in exposing and transferring an ultrafine pattern onto a semiconductor wafer by a photolithography technique. In recent years, with miniaturization of an LSI pattern formed on a semiconductor wafer, dimensions to be detected as a pattern defect have become extremely small. Thus, a pattern inspection apparatus for inspecting defects of a transfer mask used in manufacturing the LSI needs to be highly accurate.

With development of multimedia technologies, the size of a liquid crystal substrate of an LCD (Liquid Crystal Display) is becoming larger, e.g., 500 mm×600 mm or more, and a pattern of a TFT (Thin Film Transistor) or the like formed on the liquid crystal substrate is becoming finer. Therefore, it is increasingly required to inspect an ultra-fine pattern defect in a large range. For this reason, it is urgently required to develop a pattern inspection apparatus which efficiently inspects defects of a pattern of a large-area LCD and a photomask used in manufacturing the large-area LCD in a short time.

Regarding a conventional pattern inspection apparatus, it is known that inspection is performed by comparing an optical image obtained by capturing a pattern formed on a target workpiece or "sample" such as a lithography mask at a predetermined magnification by use of a magnification optical system with design image data or with an optical image of an identical pattern on the target workpiece. For example, the following is known as pattern inspection methods: "die to die inspection" which compares optical image data obtained by capturing images of identical patterns at different positions on the same mask, and "die to database inspection" which, based on writing data (data on a design pattern) generated by converting pattern CAD data used when writing a mask pattern into an appropriate format for input to an inspection apparatus, generates design image data as reference image data, and compares the reference image data with optical image data serving as measurement data obtained by capturing the image of the pattern. When inspecting using the inspection apparatus, the target workpiece is placed on a stage to be scanned by a flux of light while the stage is moving to perform inspection. The target workpiece is irradiated with a flux of light from a light source and an illumination optical system. Light transmitted through the target workpiece or reflected therefrom is focused on a sensor through the optical system. The image captured by the sensor is transmitted to a comparison circuit as measurement data. In the comparison circuit, after position alignment of the images, the measurement data and the reference data are compared based on an appropriate algorithm. If there is no matching between them, it is judged that a pattern defect exists.

The reference image is generated by performing a filter calculation for a multiple value image developed from design data by using a model function in which the mask and optical characteristics are modeled. However, for example, when defects of a micro mask pattern such as an assistant pattern are inspected, it is necessary to generate a highly precise reference image. For this reason, the resolution of the multiple value image developed from design data is increased to N times the resolution of the optical image, for example. N is, for example, an integer of two or more. Then, there has been examined a method of estimating coefficients of a model function by using the multiple value image with high resolution and a sample image for learning. According to this method, a reference image to be used for the inspection is generated by performing a filter calculation for the multiple value image developed from the design data corresponding to an image to be actually inspected, by using the estimated coefficients. Then, highly precise inspection is performed by comparing this reference image with an actual optical image.

The sample image used for estimating the coefficients has only the data of the same pixel unit as that of the actual optical image. Accordingly, it becomes necessary to also change the resolution of the sample image to N times in order to make it in accord with the resolution of the reference image which has been increased to N times. However, the sample image, whose resolution has been changed to N times, has lost the original high frequency components included in a multiple value image developed from the design data. Therefore, if coefficients of a model function are estimated by using a sample image in which the high frequency components have been lost and a multiple value image developed from design data having high frequency components, there is a problem when a reference image of an actual image is generated that the reference image is blurred compared to the actual image. As a result, there is a problem of erroneously detecting "defects" (pseudo defect detection) which are not actually defects.

Regarding generating a reference image, a technique is disclosed that performs a filtering process for rounding corner portions of a pattern (refer to e.g., Japanese Patent Application Laid-open (JP-A) No. 2005-338666). However, this processing relates to a filtering process for sufficiently precisely inspecting pattern corner portions, and does not solve the problem described above.

As mentioned above, there is a problem of generating a reference image which is blurred compared to an actual image because of estimating coefficients of a model function by using a sample image in which high frequency components have been lost and a multiple value image developed from design data having high frequency components. Consequently, there is a problem of erroneously detecting "defects" (pseudo defect detection) which are not actually defects.

BRIEF SUMMARY OF THE INVENTION

In accordance with one aspect of the present invention, a pattern inspection apparatus includes a magnification conversion unit configured to input first sample optical image data, and to convert the first sample optical image data to second sample optical image data which has a resolution N times that of the first sample optical image data, a low-pass filter configured to input first design image data which has a resolution N times that of the first sample optical image data and in which a gray level value corresponding to the first sample optical image data is defined, and to calculate second design image data by convolving the first design image data with a predetermined low-pass filtering function, an optical filter configured to calculate third design image data by convolving the second design image data with a predetermined optical model function, a coefficient acquisition unit configured to acquire a coefficient of the predetermined optical model function by performing a predetermined calculation by using the second sample optical image data and the third design image data, an optical image acquisition unit configured to acquire actual optical image data of an inspection target workpiece on which a pattern is formed, a reference image data generation unit configured to generate reference image data corresponding to the actual optical image data by using the coefficient, and a comparison unit configured to input the actual optical image data, and to compare the actual optical image data with the reference image data.

In accordance with another aspect of the present invention, a pattern inspection apparatus includes an optical image acquisition unit configured to acquire sample optical image data which has a same resolution as that of design image data, an optical filter configured to input the design image data, and to convolve the design image data with a predetermined optical model function, a coefficient acquisition unit configured to acquire a coefficient of the predetermined optical model function by performing a predetermined calculation by using the sample optical image data and the design image data which has been convolved by the predetermined optical model function, a reference image data generation unit configured to generate reference image data corresponding to actual optical image data of an inspection target workpiece, on which a pattern is formed, by using the coefficient, and a comparison unit configured to input the actual optical image data of the inspection target workpiece, and to compare it with the reference image data.

Moreover, in accordance with another aspect of the present invention, a pattern inspection apparatus includes a magnification conversion unit configured to input first sample optical image data, and to convert the first sample optical image data to second sample optical image data which has a resolution N times that of the first sample optical image data, an inverse filter configured to restore a high frequency component of the second sample optical image data, an optical filter configured to input first design image data which has a resolution N times that of the first sample optical image data and in which a gray level value corresponding to the first sample optical image data is defined, and to calculate second design image data by convolving the first design image data with a predetermined optical model function, a coefficient acquisition unit configured to acquire a coefficient of the predetermined optical model function by performing a predetermined calculation by using the second sample optical image data, the high frequency component of which has been restored, and the second design image data, an optical image acquisition unit configured to acquire actual optical image data of an inspection target workpiece on which a pattern is formed, a reference image data generation unit configured to generate reference image data corresponding to the actual optical image data by using the coefficient, and a comparison unit configured to input the actual optical image data, and to compare the actual optical image data with the reference image data.

Moreover, in accordance with another aspect of the present invention, a pattern inspection method includes inputting first sample optical image data, and converting the first sample optical image data to second sample optical image data which has a resolution N times that of the first sample optical image data, inputting first design image data which has a resolution N times that of the first sample optical image data and in which a gray level value corresponding to the first sample optical image data is defined, and calculating second design image data by convolving the first design image data with a predetermined low-pass filtering function, calculating third design image data by convolving the second design image data with a predetermined optical model function, acquiring a coefficient of the predetermined optical model function by performing a predetermined calculation by using the second sample optical image data and the third design image data, acquiring actual optical image data of an inspection target workpiece on which a pattern is formed, generating reference image data corresponding to the actual optical image data of the inspection target workpiece by using the coefficient, and inputting the actual optical image data, and comparing the actual optical image data with the reference image data to output a comparison result.

Further, in accordance with another aspect of the present invention, a pattern inspection method includes acquiring sample optical image data which has a same resolution as that of design image data, inputting the design image data, and convolving the design image data with a predetermined optical model function, acquiring a coefficient of the predetermined optical model function by performing a predetermined calculation by using the sample optical image data and the design image data which has been convolved by the predetermined optical model function, generating reference image data corresponding to actual optical image data of an inspection target workpiece, on which a pattern is formed, by using the coefficient, and inputting the actual optical image data, and comparing the actual optical image data with the reference image data to output a comparison result.

Furthermore, in accordance with another aspect of the present invention, a pattern inspection method includes inputting first sample optical image data, and converting the first sample optical image data to second sample optical image data which has a resolution N times that of the first sample optical image data, restoring a high frequency component of the second sample optical image data, inputting first design image data which has a resolution N times that of the first sample optical image data and in which a gray level value corresponding to the first sample optical image data is defined, and calculating second design image data by convolving the first design image data with a predetermined optical model function, acquiring a coefficient of the predetermined optical model function by performing a predetermined calculation by using the second sample optical image data, the high frequency component of which has been restored, and the second design image data, acquiring actual optical image data of an inspection target workpiece on which a pattern is formed, generating reference image data corresponding to the actual optical image data of the inspection target workpiece by using the coefficient, and inputting the actual optical image data of the inspection target workpiece, and comparing it with the reference image data to output a comparison result.

Furthermore, in accordance with another aspect of the present invention, a computer-readable recording medium storing a program to be executed by a computer, the program includes reading first sample optical image data stored in a storage device, and converting the first sample optical image data to second sample optical image data which has a resolution N times that of the first sample optical image data, inputting first design image data which has a resolution N times that of the first sample optical image data and in which a gray level value corresponding to the first sample optical image data is defined, and calculating second design image data by convolving the first design image data with a predetermined low-pass filtering function, calculating third design image data by convolving the second design image data with a predetermined optical model function, acquiring a coefficient of the predetermined optical model function by performing a predetermined calculation by using the second sample optical image data and the third design image data, generating reference image data corresponding to actual optical image data of an inspection target workpiece, on which a pattern is formed, by using the coefficient, and inputting the actual optical image data, and comparing the actual optical image data with the reference image data to output a comparison result.

Furthermore, in accordance with another aspect of the present invention, a computer-readable recording medium storing a program to be executed by a computer, the program includes inputting design image data, and convolving the design image data with a predetermined optical model function, reading sample optical image data, which has a same resolution as that of the design image data, stored in a storage device, and acquiring a coefficient of the predetermined optical model function by performing a predetermined calculation by using the sample optical image data and the design image data which has been convolved by the predetermined optical model function, generating reference image data corresponding to actual optical image data of an inspection target workpiece, on which a pattern is formed, by using the coefficient, and inputting the actual optical image data, and comparing the actual optical image data with the reference image data to output a comparison result.

Furthermore, in accordance with another aspect of the present invention, a computer-readable recording medium storing a program to be executed by a computer, the program includes reading first sample optical image data stored in a storage device, and converting the first sample optical image data to second sample optical image data which has a resolution N times that of the first sample optical image data, restoring a high frequency component of the second sample optical image data, inputting first design image data which has a resolution N times that of the first sample optical image data and in which a gray level value corresponding to the first sample optical image data is defined, and calculating second design image data by convolving the first design image data with a predetermined optical model function, acquiring a coefficient of the predetermined optical model function by performing a predetermined calculation by using the second sample optical image data, the high frequency component of which has been restored, and the second design image data, generating reference image data corresponding to actual optical image data of an inspection target workpiece, on which a pattern is formed, by using the coefficient, and inputting the actual optical image data, and comparing the actual optical image data with the reference image data to output a comparison result.

BRIEF DESCRIPTION OF THE DRAWINGS

FIG. 7 shows an example of a coefficient matrix of an optical model function according to Embodiment 1;

FIG. 8 shows an example of design image data according to Embodiment 1;

DETAILED DESCRIPTION OF THE INVENTION

In the Embodiments hereinafter described, there will be explained an apparatus and a method for inspecting a pattern by which a reference image further closer to an actual image can be generated.

Embodiment 1

Figure 1:
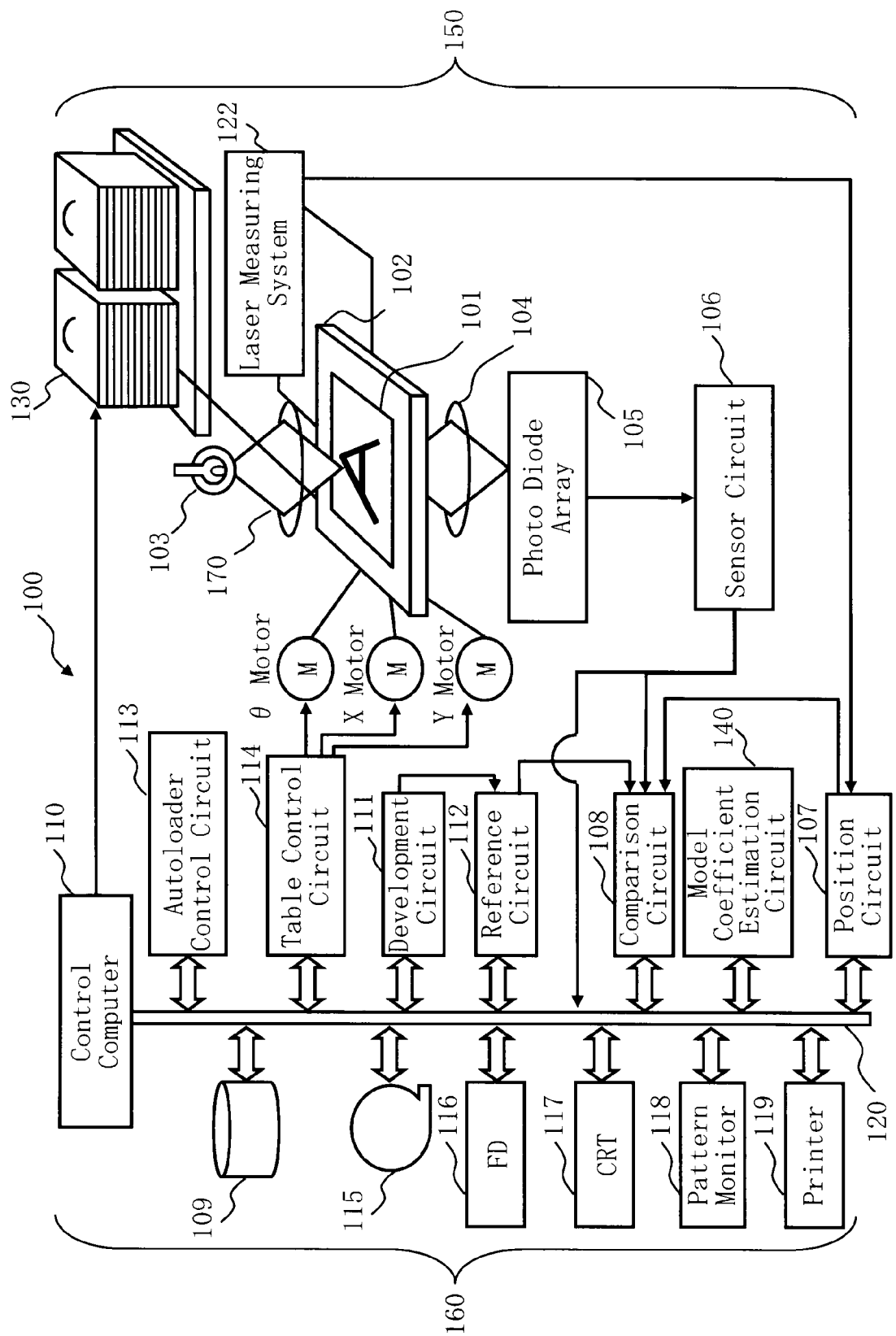
FIG. 1 is a schematic diagram showing the structure of a pattern inspection apparatus according to Embodiment 1.

FIG. 1 is a schematic diagram showing the structure of a pattern inspection apparatus according to Embodiment 1. In FIG. 1, a pattern inspection apparatus 100, which inspects defects of a target workpiece being a substrate, such as a mask and a wafer, includes an optical image acquisition unit 150 and a control circuit 160. The optical image acquisition unit 150 includes an XYθ table 102, a light source 103, a magnification optical system 104, a photo diode array 105, a sensor circuit 106, a laser length measuring system 122, an autoloader 130, and an illumination optical system 170. In the control circuit 160, a control computer 110 being a computer is connected, through a bus 120 used as a data transmission line, to a position circuit 107, a comparison circuit 108 being an example of a comparison unit, a development circuit 111, a reference circuit 112 being an example of a reference image data generation unit, an autoloader control circuit 113, a table control circuit 114, a model coefficient estimation circuit 140, a magnetic disk drive 109 being an example of a storage device, a magnetic tape drive 115, a flexible disk drive (FD) 116, a CRT 117, a pattern monitor 118, and a printer 119. Moreover, the XYθ table 102 is driven by an X-axis motor, a Y-axis motor, and a θ-axis motor. FIG. 1 depicts structure elements necessary for describing Embodiment 1, and it should be understood that other structure elements generally necessary for the pattern inspection apparatus 100 may be also included therein.

Figure 2:
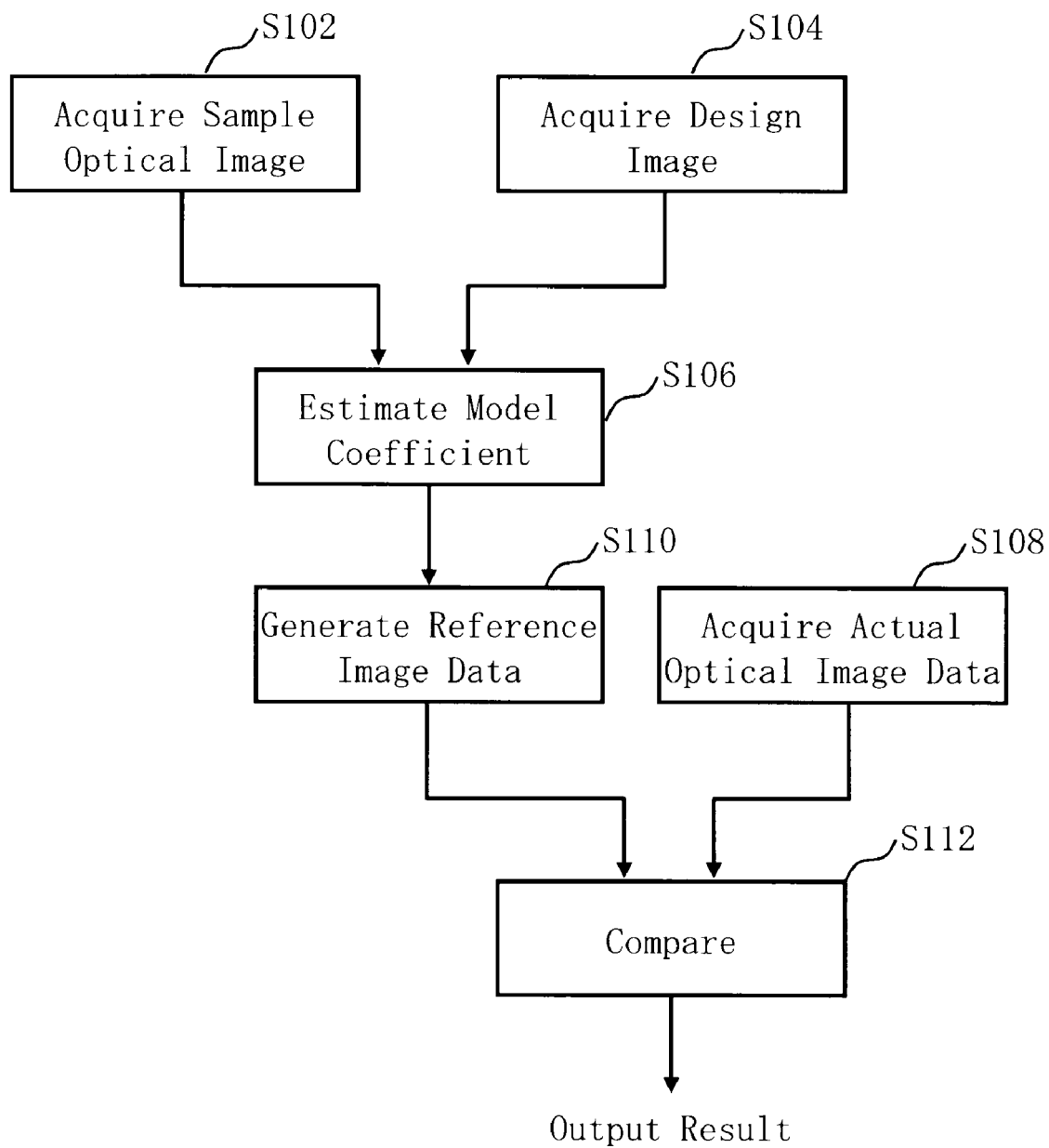
FIG. 2 is a flowchart showing main steps of a pattern inspection method according to Embodiment 1.

FIG. 2 is a flowchart showing main steps of a pattern inspection method according to Embodiment 1. In FIG. 2, the pattern inspection method of Embodiment 1 executes a series of steps as an example: a sample optical image acquisition step (S102), a design image acquisition step (S104), a model coefficient estimation step (S106), an actual optical image data acquisition step (S108), a reference image data generation step (S110), and a comparison step (S112).

When performing an inspection, first, before the inspection, a photomask 101 serving as a target workpiece to be inspected or "inspection sample" is loaded and placed on the XYθ table 102 by the autoloader 130 which is controlled by the autoloader control circuit 113. The XYθ table 102 is movable in a horizontal direction and a rotation direction by the X-, Y-, and θ-axis motors.

The XYθ table 102 is driven by the table control circuit 114 under the control of the control computer 110. The XYθ table 102 can be moved by a drive system such as a three-axis (X-Y-θ) motor, which drives the XYθ table 102 in the X direction, the Y direction, and the θ direction. For example, a step motor can be used as these X, Y, and θ motors. The moving position of the XYθ table 102 is measured by the laser length measurement system 122 and supplied to the position circuit 107. The photomask 101 on the XYθ table 102 is automatically conveyed from the autoloader 130 driven by the autoloader control circuit 113, and automatically ejected after the inspection.

Figure 3:
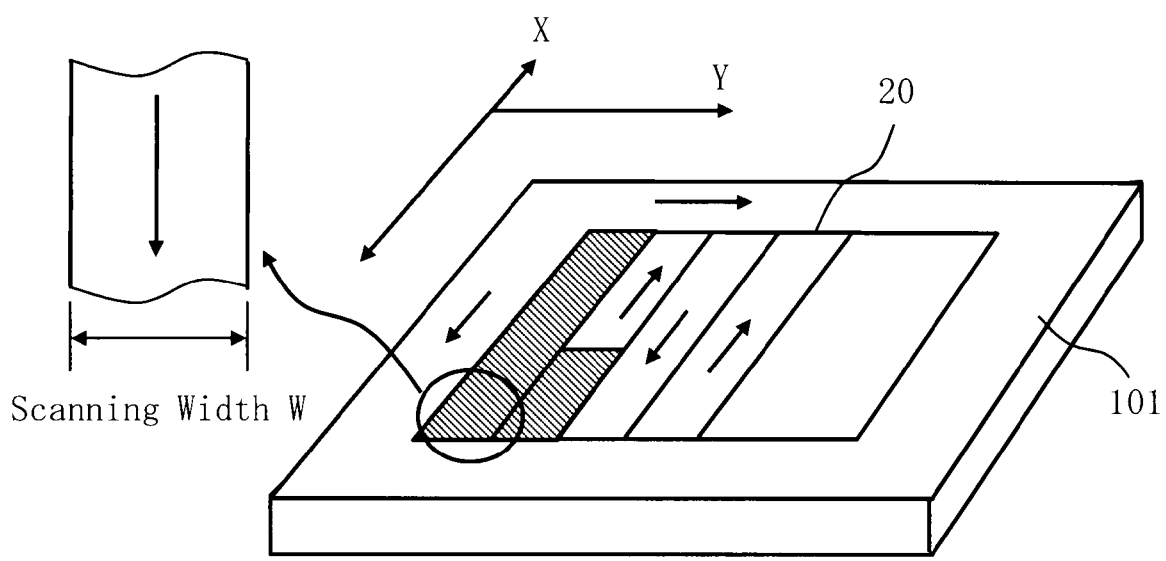
FIG. 3 shows a diagram for explaining a procedure of acquiring an optical image according to Embodiment 1.

FIG. 3 shows a diagram for explaining a procedure of acquiring an optical image according to Embodiment 1. As shown in the figure, a region to be inspected is virtually divided into a plurality of strip-like inspection stripes 20, each having a scanning width W, in the Y direction, for example. To acquire an optical image, the movement of the XYθ table 102 is controlled so that each of the divided inspection stripes can be continuously scanned, while moving in the X direction. In the photo diode array 105, images each having the scanning width W as shown in FIG. 3 are continuously input. After an image in the first inspection stripe 20 having been scanned, similarly an image of the scanning width W in the second inspection stripe 20 is continuously input while moving in the reverse direction. When acquiring an image in the third inspection stripe, the image is scanned while moving in the direction reverse to the direction for scanning the image in the second inspection stripe, i.e., the same direction of scanning the image in the first inspection stripe. Continuously acquiring images in this manner makes it possible to reduce wasteful processing time. Although the forward (FWD)-back word (BWD) method is herein used, it is not limited thereto, and then, the forward (FWD)-forward (FWD) method may also be used.

Then, optical image data (measurement data) of the photomask 101 serving as a target workpiece to be inspected, on which a pattern has been formed, is acquired. Measurement data is acquired by the optical image acquisition unit 150. Specifically, the optical image data is acquired as follows: A pattern formed on the photomask 101 is irradiated with lights from the appropriate light source 103 arranged above the XYθ table 102. The photomask 101 serving as a target workpiece is irradiated with a flux of light from the light source 103 through the illumination optical system 170. Below the photomask 101, the magnification optical system 104, the photo diode array 105, and the sensor circuit 106 are arranged. The light transmitted through the photomask 101 serving as a target workpiece such as an exposure mask is focused on the photo diode array 105 as an optical image, through the magnification optical system 104, to enter the photo diode array 105. A focus adjustment (focus control) of the magnification optical system 104 may be automatically performed by the automatic focusing mechanism.

The pattern image focused on the photo diode array 105 is photoelectrically converted by the photo diode array 105, and furthermore, A/D (analog to digital) converted by the sensor circuit 106. In the photo diode array 105, a sensor such as a TDI sensor is arranged. By continuously moving the XYθ table 102 serving as a stage in the X-axis direction, the TDI sensor captures the image of the pattern of the photomask 101 serving as a target workpiece. An inspection optical system having a large magnification is composed of the light source 103, the magnification optical system 104, the photo diode array 105, and the sensor circuit 106.

The measurement data (optical image) output from the sensor circuit 106 is sent to the comparison circuit 108, with the data output from the position circuit 107 and indicating a position of the photomask 101 on the XYθ table 102. The measurement data is 8-bit unsigned data, for example, and expresses a gray level of the brightness of each pixel, by 0 to 255, for example.

On the other hand, image data (reference data) compared with the measurement data is generated as follows by the development circuit 111 and the reference circuit 112. The information data on the design pattern used when forming a pattern of the photomask 101 is stored in the magnetic disk drive 109 being an example of a storage device (storage unit). Then, the development circuit 111 reads the information data on a design pattern from the magnetic disk drive 109 using the control computer 110, and converts the read design pattern being design figure data of the photomask 101 into image data (design image data) of binary values or multiple values. Then, this image data is sent to the reference circuit 112. The reference circuit 112 performs suitable filtering processing for the sent design image data being the image data of the figure.

As mentioned above, the optical image acquisition unit 150 acquires the optical image data (measurement data) of the photomask 101, serving as a target workpiece to be inspected, on which a pattern has been formed. However, the measurement data being an optical image obtained from the sensor circuit 106 which is a structure element of the optical image acquisition unit 150 is in a state affected by the filtering due to the resolution characteristics of the magnification optical system 104 and/or the aperture effect, etc. of the photo diode array 105, in other words, in an analog state continuously changing. Therefore, if the measurement data is compared with the design image data, being image data of the design side, whose image intensity (gray value) is a digital value, there occurs a case of making an erroneous judgment (pseudo defect detection), namely judging what is not a defect in fact to be defective. Then, by applying a filtering process using a model function, wherein the photomask 101 and optical characteristics are modeled, to the design image data, it becomes possible to match the design image data with the measurement data. That is, reference data produced by filtering the design image data is compared with the measurement data obtained from the photomask 101. This reference data y can be obtained by convolving (convolution integral) an optical model function f used as a filter with design image data u. Expressing this in frequency space, it can be shown as the following equation (1).

$$y(s)=f(s)\cdot u(s) \qquad (1)$$

Reference data being highly precisely matched with measurement data can be generated by appropriately setting a coefficient $a_{i,j}$ of the optical model function f. Therefore, first, the coefficient $a_{i,j}$ of the optical model function f is calculated before inspecting the photomask 101.

In the sample optical image acquisition step (S102), sample optical image data for learning (first sample optical image data) is acquired. As the sample optical image data for learning, a part of an image of the photomask 101 serving as an inspection target workpiece can be acquired by the optical image acquisition unit 150, and alternatively, data prepared separately may be used. Then, the sample optical image data is stored in the magnetic disk drive 109.

In the design image acquisition step (S104), design image data (first design image data) corresponding to the sample optical image data is acquired. As the design image data corresponding to the sample optical image data, an image developed from the design data used for forming a pattern of the photomask 101 serving as an inspection target workpiece by the development circuit 111 can be used, and alternatively, data prepared separately may be used. The design image data is stored in the magnetic disk drive 109.

Figure 4:
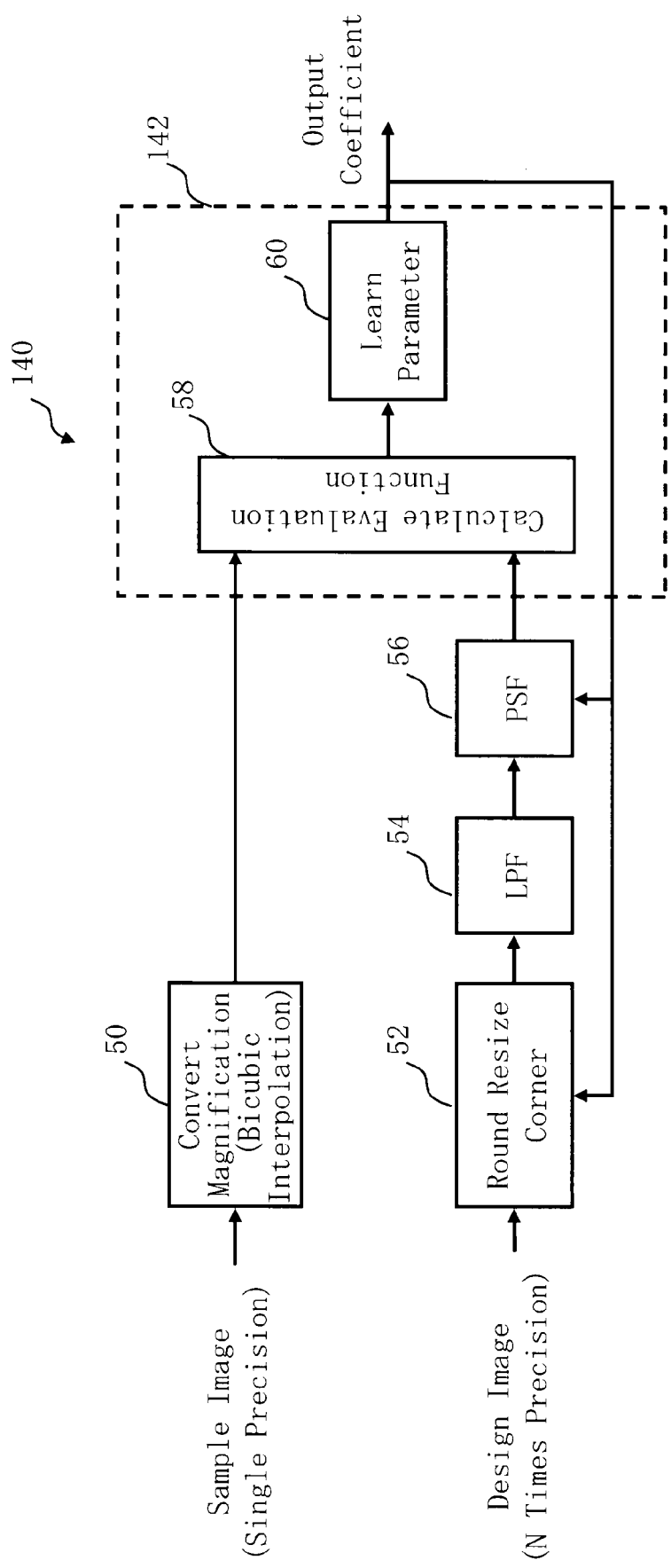
FIG. 4 is a block diagram showing the internal structure of a model coefficient estimation circuit according to Embodiment 1.

As the model coefficient estimation step (S106), the model coefficient estimation circuit 140 estimates the coefficient $a_{i,j}$ of the optical model function f. FIG. 4 is a block diagram showing the internal structure of a model coefficient estimation circuit according to Embodiment 1. In the model coefficient estimation circuit 140, the magnification conversion unit 50 reads and inputs sample optical image data for learning (first sample optical image data), used for obtaining the coefficient $a_{i,j}$, from the magnetic disk drive 109. Then, the resizing unit 52 reads and inputs design image data (first design image data) corresponding to the sample optical image data from the magnetic disk drive 109. The design image data has a resolution N times that of the sample optical image data, and in the design image data, a gray level value corresponding to the sample optical image data is defined. As mentioned above, in order to inspect defects of a fine mask pattern, such as an assistant pattern, it is necessary to generate a highly precise reference image. By setting the resolution of the design image data to be N times the resolution of the sample optical image data, the coefficient for generating a highly precise reference image can be estimated.

The magnification conversion unit 50 converts the input sample optical image data into a second sample optical image data having the N times resolution. Thereby, it becomes possible to match the resolution with that of the design image data.

Figures 5, 6:
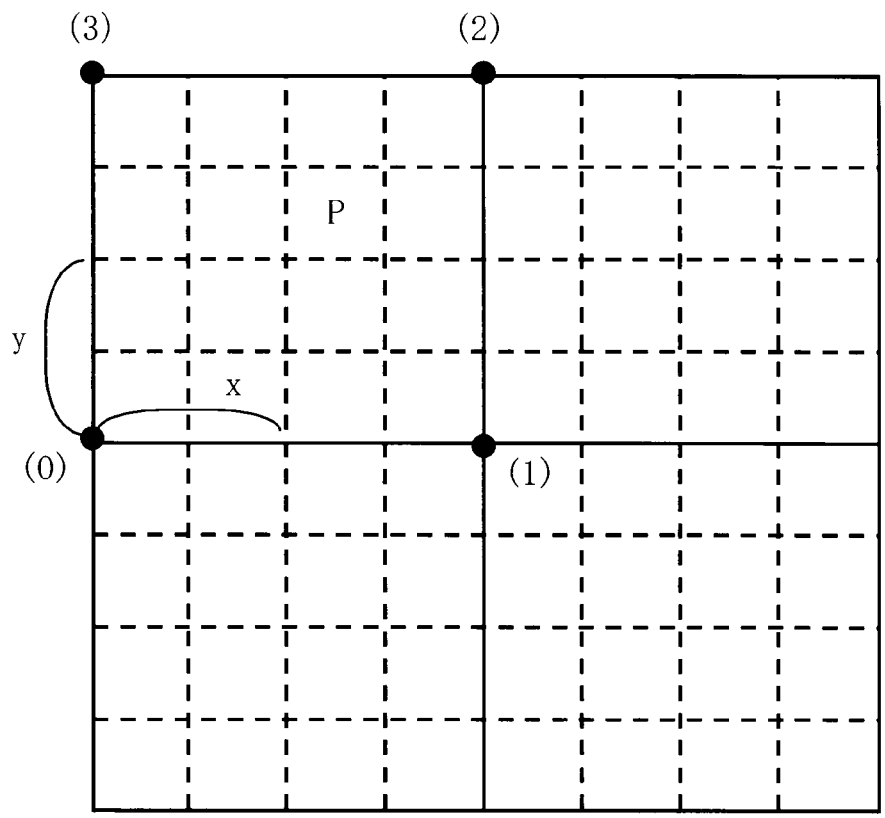
FIG. 5 is a schematic diagram for explaining magnification changing according to Embodiment 1.
FIG. 6 shows an example of a coefficient matrix of a low-pass filtering function according to Embodiment 1.

FIG. 5 shows a schematic diagram for explaining magnification changing or "converting" according to Embodiment 1. In FIG. 5, as an example, there is shown sample optical image data of 2×2 pixels represented in solid lines. In this case, the magnification of each pixel is changed to N=4, that is, to the size of a sub pixel of 4×4 represented in dotted lines. The data value (gray level value) in each sub pixel may be calculated by a linear interpolation method or a bicubic interpolation method. The sample optical image data used for estimating the coefficient has only the data of the same pixel unit as that of an actual optical image. Therefore, the resolution of the sample image also needs to be changed to N times. However, the second sample optical image data $y_{i,j}$, whose resolution has been changed to N times, has lost high frequency components included in a multiple value image developed from the design data. The second sample optical image data $y_{i,j}$ whose resolution has been changed to N times is output to an evaluation function calculation unit 58.

The resizing unit 52 performs resizing and corner rounding processing for the input design image data. Then, the resized and corner-rounded design image data is output to a low pass filter (LPF) 54.

The LPF 54 inputs the design image data, and calculates the second design image data by convolving the design image data and a predetermined low-pass filtering function.

FIG. 6 shows an example of a coefficient matrix of a low-pass filtering function according to Embodiment 1. In FIG. 6, as an example, there is shown a coefficient matrix of a low-pass filtering function corresponding to the design image data having a data region of grid of 4×4. For example, a coefficient matrix of 1/(the number of total grids) is set so that adding all may be 1. This grid size of 4×4 matches the image whose resolution has been increased to N times so that the pixel of 2×2 shown in the solid lines of FIG. 5 may be a sub-pixel size of 1/N. In this case, there is shown an image, as an example, having the same resolution as that of image whose magnification has been increased to 4 times as shown in the dotted line of FIG. 5. By convolving such a low-pass filtering function with the design image data after resizing, high frequency components are lost like the sample optical image data. As a result, it is possible to match the conditions of frequency components between the output data of the LPF 54 and the sample optical image data. Then, the second design image data having passed the LPF 54 is output to an optical filter (PSF) 56.

The PSF 56 calculate the third design image data by convolving the second design image data with the optical model function f shown in the equation (1). Reference image data $y'_{i,j}$ for sampling (third design image data) generated by calculation using design image data $u_{i,j}$ and the coefficient $a_{i,j}$ of the optical model function f can be expressed by the following equation (2).

$$y'_{i,j} = \sum_{i_0, j_0} a_{i-i_0, j-j_0} \cdot u_{i_0, j_0} \qquad (2)$$

Figures 7, 8:
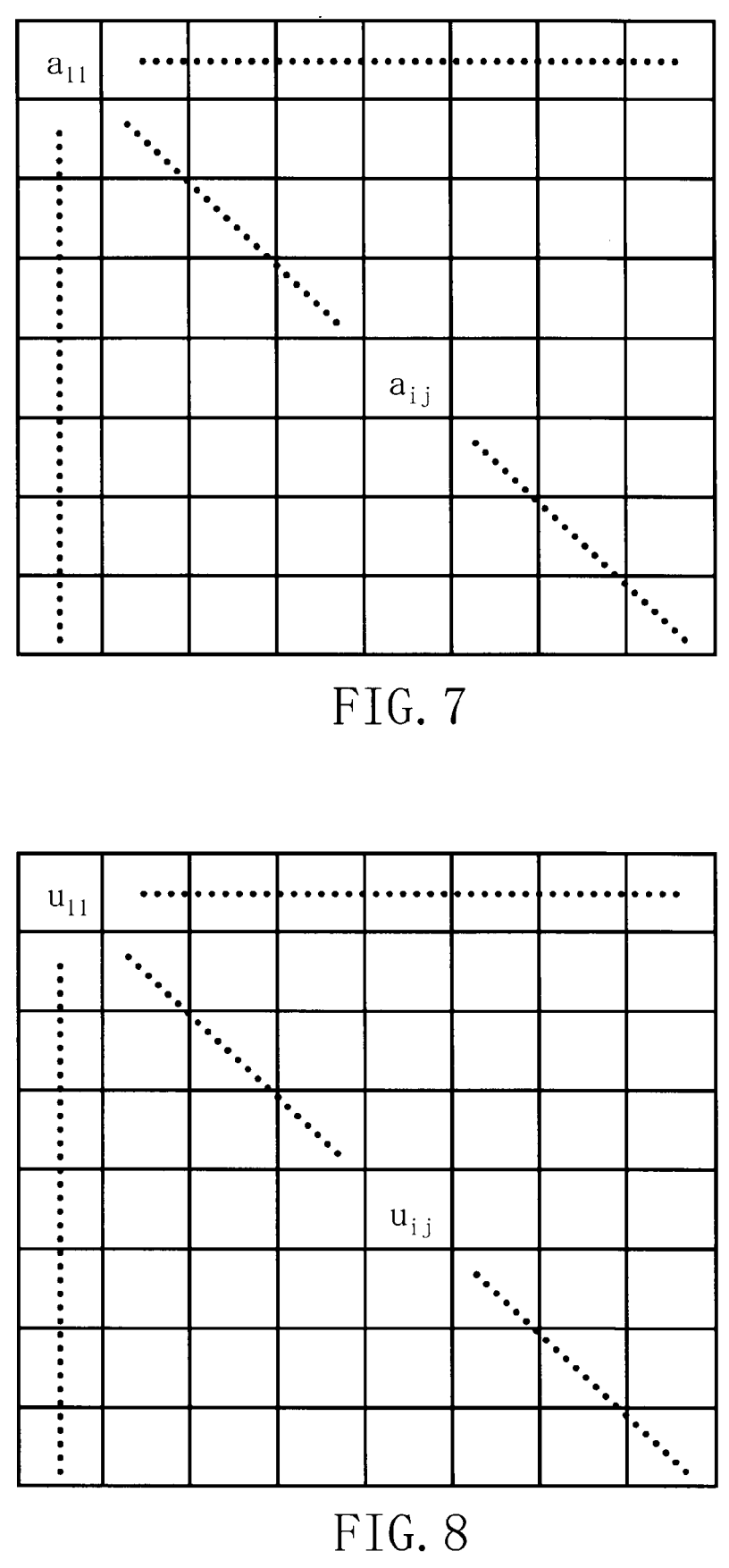

FIG. 7 shows an example of the coefficient matrix of an optical model function according to Embodiment 1. In FIG. 7, as an example, there is shown a coefficient matrix of the optical model function f corresponding to the design image data having a data region of grid of 8×8. The grid size of 8×8 matches the image whose resolution has been increased to N times so that the pixel of 2×2 shown in the solid lines of FIG. 5 may be a sub-pixel size of 1/N. An arbitrary value may be set as each coefficient $a_{i,j}$ beforehand.

FIG. 8 shows an example of the design image data according to Embodiment 1. In FIG. 8, as an example, there is shown design image data $u_{i,j}$ having a data region of grid of 8×8. The grid size of 8×8 matches the image whose resolution has been increased to N times so that the pixel of 2×2 shown in the solid lines of FIG. 5 may be a sub-pixel size of 1/N.

The reference image data $y'_{i,j}$ for sampling can be generated by convolving the second design image data $u_{i,j}$ with the coefficient matrix of the optical model function f. If the obtained reference image data $y'_{i,j}$ for sampling is in accord with the second sample optical image data $y_{i,j}$, detection of a pseudo defect can be avoided. However, since an arbitrary value is set herein as each coefficient $a_{i,j}$, there is often the case that the obtained reference image data $y'_{i,j}$ for sampling is not close to the second sample optical image data $y_{i,j}$. Thus, a more suitable coefficient $a_{i,j}$ is to be estimated by performing the subsequent feedback calculation. The reference image data $y'_{i,j}$ for sampling is output to the evaluation function calculation unit 58.

The coefficient acquisition unit 142 includes the evaluation function calculation unit 58 and a parameter learning unit 60. The coefficient acquisition unit 142 acquires each coefficient $a_{i,j}$ of the optical model function f by performing a predetermined calculation using the second sample optical image data $y_{i,j}$, and the reference image data $y'_{i,j}$ for sampling. First, the evaluation function calculation unit 58 inputs the second sample optical image data $y_{i,j}$, and the reference image data $y'_{i,j}$ for sampling, and then, calculates the equation (3) shown below.

$$S = \sum_{i_0,j_0} \left( y_{i,j} - \sum_{i,j} a_{i-i_0, j-j_0} \cdot u_{i_0,j_0} \right)^2 \quad (3)$$
$$= \sum_{i,j} (y_{i,j} - y'_{i,j})^2$$

A calculation result S of the equation (3) is output to the parameter learning unit 60. While storing the calculation result S in the memory (not shown), the parameter learning unit 60 changes the value of the coefficient $a_{i,j}$, and feeds it back to the PSF 56. Using the value of the new coefficient $a_{i,j}$, the PSF 56 calculates the equation (2) and outputs the calculation result, namely new reference image data $y'_{i,j}$ for sampling, to the evaluation function calculation unit 58. Then, using the new reference image data $y'_{i,j}$ for sampling, the evaluation function calculation unit 58 calculates the equation (3) and outputs the calculation result S to the parameter learning unit 60. While storing the calculation result S in the memory (not shown), the parameter learning unit 60 changes the value of the coefficient $a_{i,j}$, and feeds it back to the PSF 56. In this way, the parameter learning unit 60 changes the value of the coefficient $a_{i,j}$ in order, and accumulates the calculation results S. Then, the minimum value in the accumulated calculation results S is selected. The parameter learning unit 60 acquires a coefficient $a_{i,j}$ used for the minimum calculation result S. Thus, the coefficient acquisition unit 142 estimates a more suitable coefficient $a_{i,j}$.

When the coefficient $a_{i,j}$ is also used in calculation by the resizing unit 52, what is necessary is to perform a feed-back also to the resizing unit 52 as shown in FIG. 4. It is sufficient to include the resizing unit 52 and the LPF 54 in the feedback circuit. Then, the coefficient $a_{i,j}$ used for the minimum calculation result S of the equation (3) needs to be acquired as mentioned above. The parameter learning unit 60 outputs the acquired coefficient $a_{i,j}$. The output coefficient $a_{i,j}$ is stored in the magnetic disk drive 109. Alternatively, it may be output to the reference circuit 112.

By the method mentioned above, a suitable coefficient $a_{i,j}$ of the optical model function f can be obtained by the model coefficient estimation circuit 140.

Figure 9A:
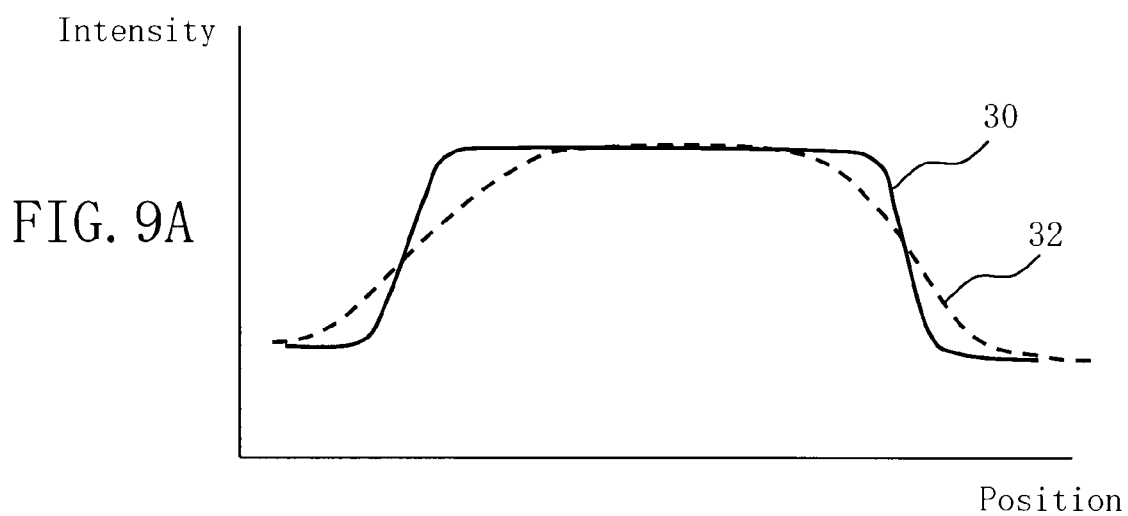
FIGS. 9A and 9B show an example of comparing sample optical image data with reference image data for sampling according to Embodiment 1.
Figure 9B:
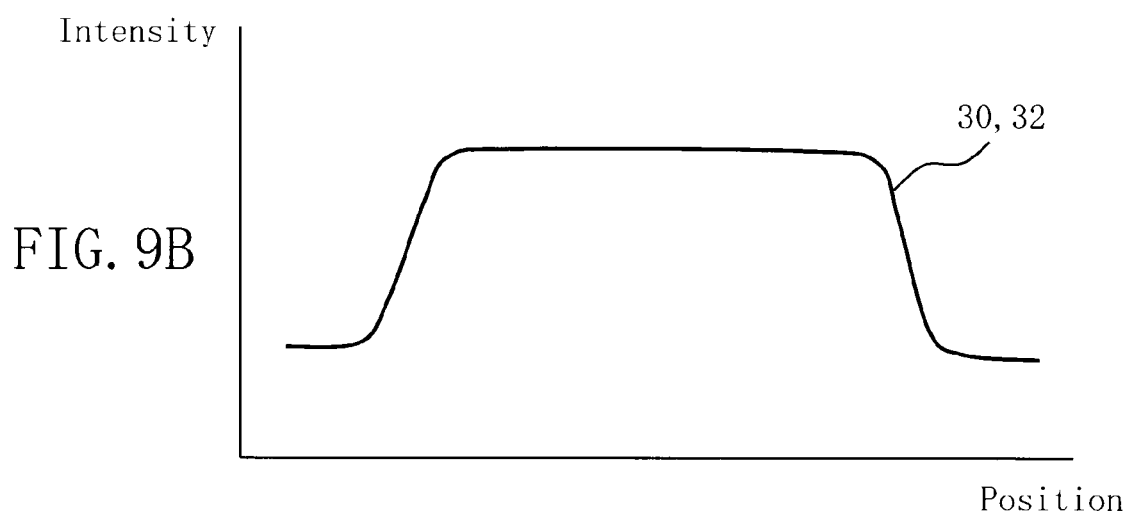

FIGS. 9A and 9B show an example of comparing the sample optical image data with the reference image data for sampling according to Embodiment 1. FIG. 9A shows sample optical image data 30 and reference image data 32 for sampling in the case of generating the reference image data for sampling without letting the design image data pass through the LPF 54. In contrast to the sample optical image data 30 represented in the solid line, the reference image data 32 for sampling represented in the dotted line rises or falls at a gentle angle, to become a so-called "blurred" line. This is caused by obtaining the coefficient $a_{i,j}$ by using the sample optical image data which lost high frequency components and the design image data which has high frequency components. On the other hand, if the reference image data is generated by using the coefficient $a_{i,j}$ obtained when matching both the frequency conditions by letting the design image data pass through the LPF 54, it becomes possible to make the sample optical image data 30 be in accord with the reference image data 32 for sampling as shown in FIG. 9B.

Figure 10A:
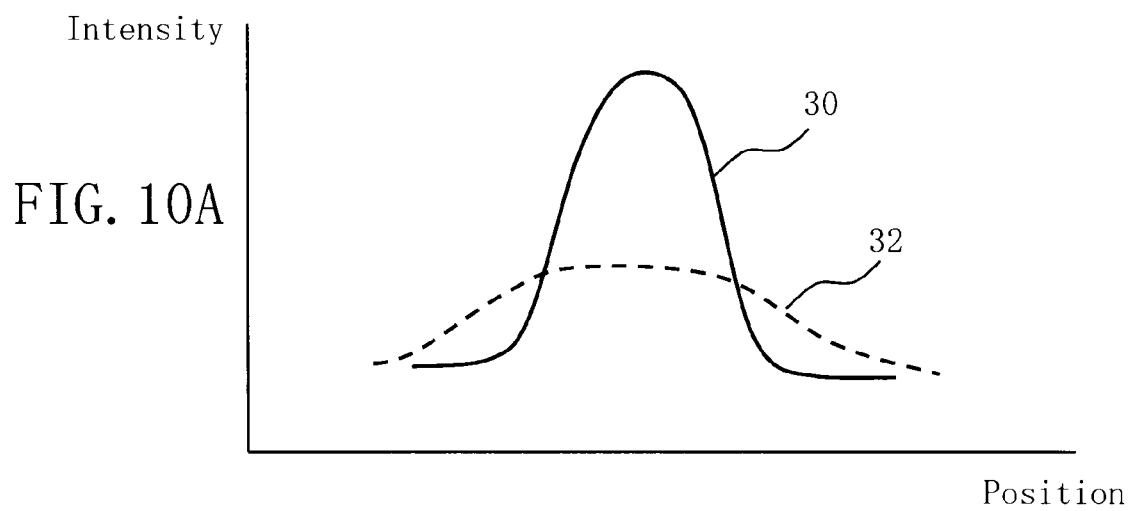
FIGS. 10A and 10B show another example of comparing sample optical image data with reference image data for sampling according to Embodiment 1.
Figure 10B:
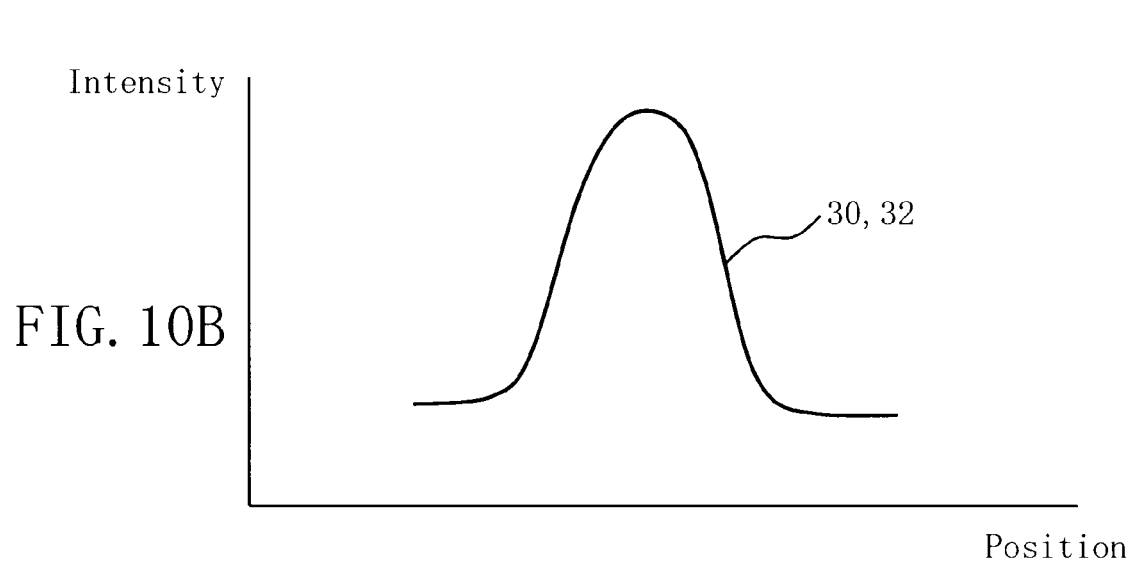

FIGS. 10A and 10B show another example of comparing the sample optical image data with the reference image data for sampling according to Embodiment 1. The effect of the LPF 54 appears remarkably in the case of a fine mask pattern, such as an assistant pattern. If estimating the coefficient $a_{i,j}$ by using the design image data which has not passed through the LPF 54, in contrast to the sample optical image data 30 shown in the solid line, the reference image data 32 for sampling shown in the dotted line rises or falls with a gentle gradient, thereby further increasing the intensity difference. On the other hand, when matching both the frequency conditions by letting the design image data pass through the LPF 54, it becomes possible to make the sample optical image data 30 be in accord with the reference image data 32 for sampling even in the case of a fine mask pattern, as shown in FIG. 10B.

Preparation for inspection has been performed as mentioned above, and then, inspection of the photomask 101 being an inspection target is performed.

First, as the actual optical image data acquisition step (S110), the optical image acquisition unit 150 acquires actual optical image data of the photomask 101, serving as a target workpiece to be inspected, on which a pattern has been formed. The concrete acquisition method has already been described above.

As the reference image data generation step (S108), reference image data is generated by the development circuit 111 and the reference circuit 112. First, the development circuit 111 reads information data on a design pattern from the magnetic disk drive 109 through the control computer 110, and converts the read design pattern being design figure data of the photomask 101 into image data (design image data) of binary values or multiple values. Then, this image data is sent to the reference circuit 112. The reference circuit 112 generates reference image data corresponding to the actual optical image data of the photomask 101 by using a suitable coefficient $a_{i,j}$ of the optical model function f.

Figure 11:
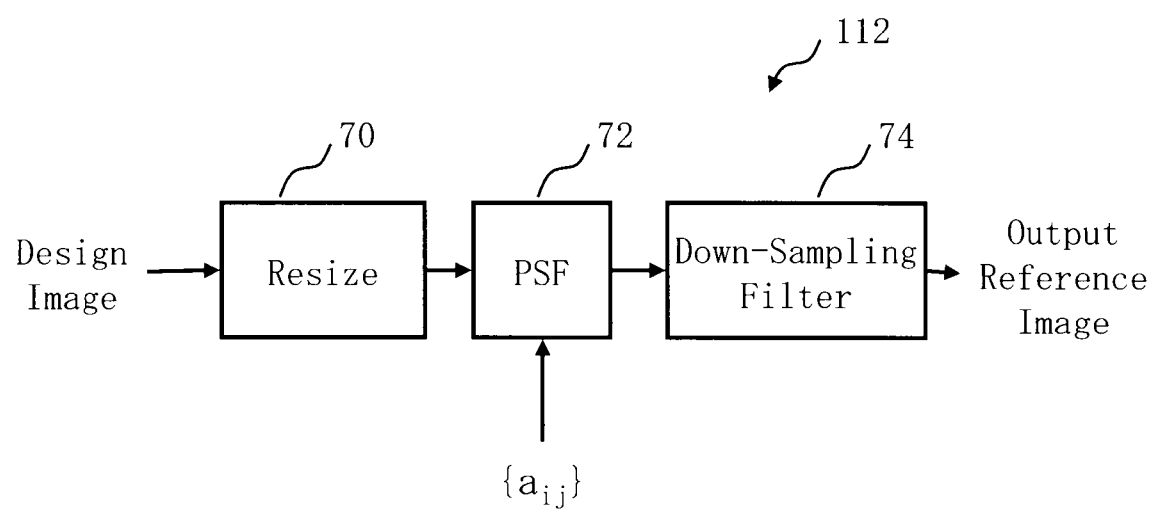
FIG. 11 is a block diagram showing the internal structure of a reference circuit according to Embodiment 1.

FIG. 11 is a block diagram showing the internal structure of a reference circuit according to Embodiment 1. In order to increase the inspection precision, the design image data output from the development circuit 111 has a resolution N times that of the actual optical image data, and in the design image data, a gray level value corresponding to the actual optical image data is defined. First, the resizing unit 70 inputs design image data, and resizes the defined pattern similarly to the resizing unit 52. Then, the resized design image data is output to an optical filter (PSF) 72 which is similar to the PSF 56. At this time, the reference circuit 112 reads a suitable coefficient $a_{i,j}$ of the optical model function f from the magnetic disk drive 109, and sets it in the PSF 72.

The PSF 72 generates reference image data by performing a filtering process of convolving an optical model function f, in which a suitable coefficient $a_{i,j}$ is set, with the resized design image data, based on the equation (2). The obtained reference image data is output to an N×N average down sampling filter 74.

Here, since the actual optical image data has a pixel value of the resolution which is set in the optical image acquisition unit 150, the resolution of the reference image data at the time of the PSF 72 outputting is N times the resolution of the actual optical image data. Since it is impossible to compare the gray level values each other in this situation, the region size indicated by each data of the reference image data at the time of the PSF 72 outputting is changed to the pixel size of the actual optical image data by using the N×N average down sampling filter 74. For example, magnification is changed from the grid of 8×8 to the grid of 2×2. As a data value after the changing, an average value of data values of a plurality of grids combined may be used. In this way, the resolution of the actual optical image data is matched with the resolution of the reference image data. Then, the reference image data after the matching is output to the comparison circuit 108.

As the comparison step (S112), the comparison unit 108 inputs actual optical image data of the photomask 101 and reference image data generated in the reference circuit 112, and then, after aligning the positions of the input actual optical image data and reference image data, compares both of them at each pixel according to a predetermined algorithm, to judge the existence of a defect.

As mentioned above, a highly precise optical model can be obtained by matching the frequency conditions by performing a low-pass filtering using the LPF 54. Then, detection of a pseudo defect can be reduced by using this optical model.

Embodiment 2

While the data in which resolution of a design image is N times higher than that of an optical image is used in Embodiment 1, it is not limited thereto. In Embodiment 2, the case will be described in which both the design image and the optical image use data each having the same resolution.

Figure 12:
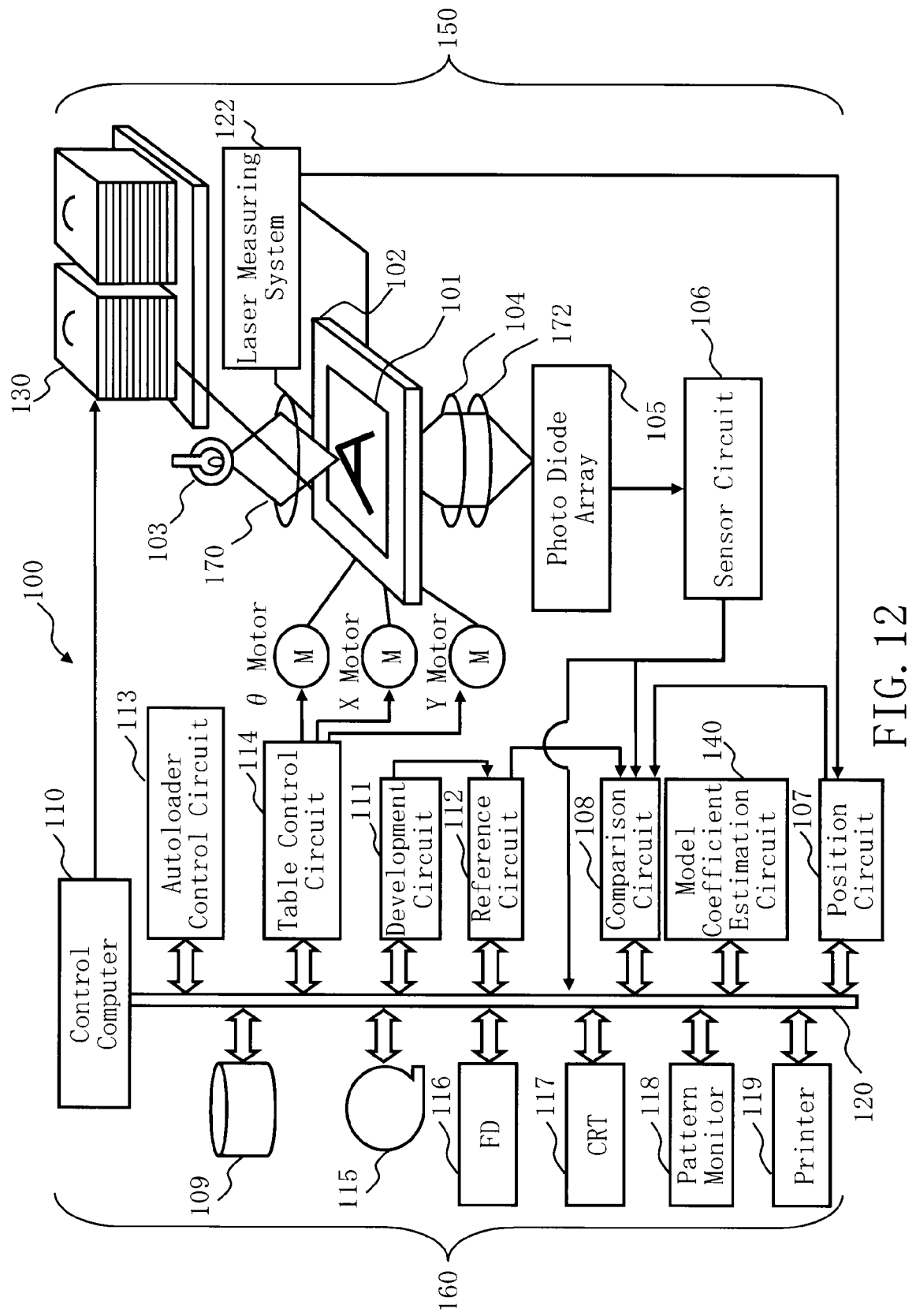
FIG. 12 is a schematic diagram showing the structure of a pattern inspection apparatus according to Embodiment 2.

FIG. 12 is a schematic diagram showing the structure of a pattern inspection apparatus according to Embodiment 2. FIG. 12 is the same as FIG. 1 except for the addition of a magnification lens 172. Moreover, the main steps of the pattern inspection method are the same as those in FIG. 2. In Embodiment 2, resolution of an optical image is increased to N times that described in Embodiment 1 by using the magnification lens 172. Thereby, it is possible to make the resolution of an optical image, which can be obtained by the optical image acquisition unit 150, be in accord with the resolution of a design image.

Figure 13:
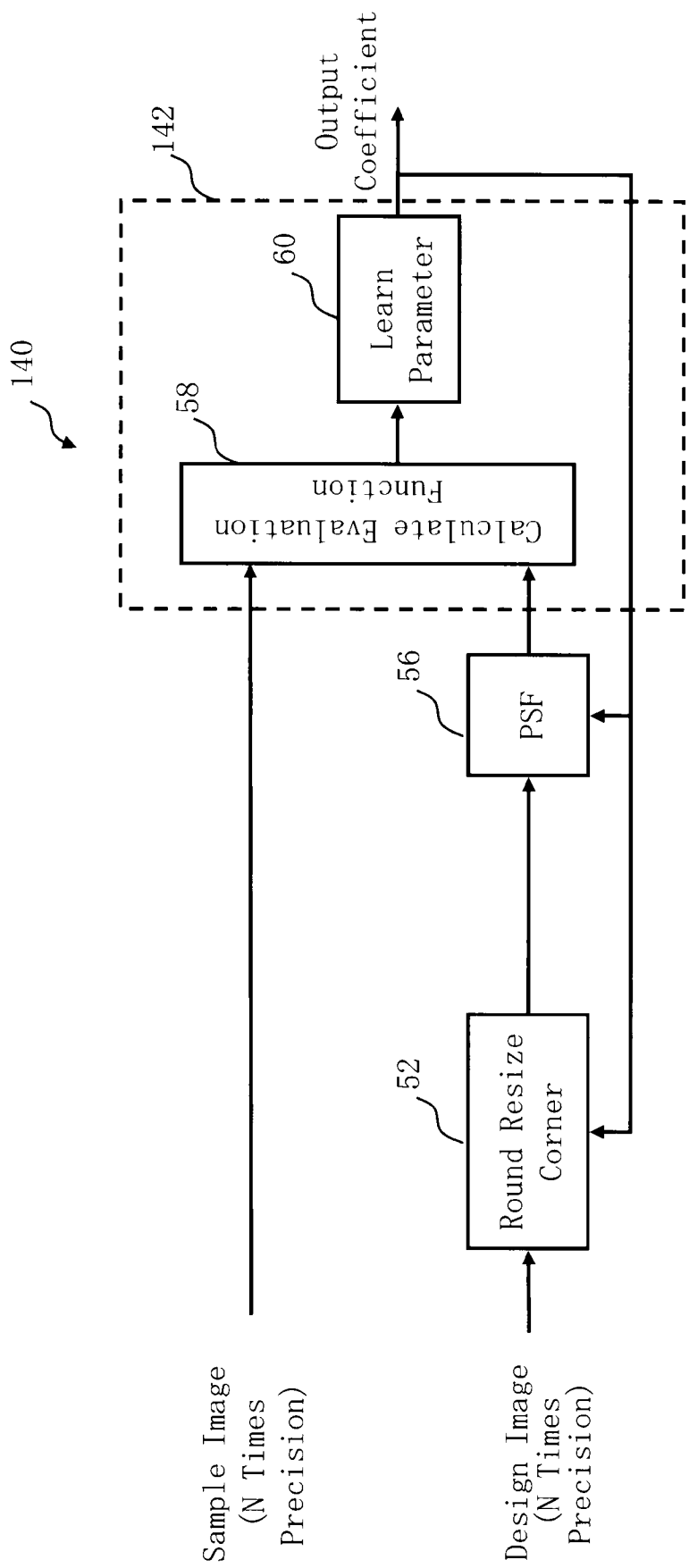
FIG. 13 is a block diagram showing the internal structure of a model coefficient estimation circuit according to Embodiment 2.

FIG. 13 is a block diagram showing the internal structure of a model coefficient estimation circuit according to Embodiment 2. FIG. 13 is the same as FIG. 4 except for the deletion of the magnification conversion unit 50 and the LPF 54. Since resolution of the optical image has been increased to N times, it is unnecessary to convert magnification by the magnification conversion unit 50. As a result, high frequency components are not lost. Therefore, the low-pass filtering process by the LPF 54 can be omitted even with respect to design image data. Thus, a suitable coefficient $a_{i,j}$ of the optical model function f can be estimated by using the model coefficient estimation circuit 140.

First, the optical image acquisition unit 150 acquires sample optical image data having the same resolution as that of design image data. As sample optical image data for learning, a part of an image of the photomask 101 serving as an inspection target workpiece can be used, and alternatively, data prepared separately may be stored in the magnetic disk drive 109. Here, resolution of the sample optical image data is increased to N times that described in Embodiment 1 by letting the data pass through the magnification lens 172.

On the other hand, the resizing unit 52 reads and inputs design image data (first design image data) corresponding to the sample optical image data from the magnetic disk drive 109. The design image data has the same resolution as that of the sample optical image data, and in the design image data, a gray level value corresponding to the sample optical image data is defined. The design image data is the same as that described in Embodiment 1. Therefore, as to the design image data, as well as Embodiment 1, an image developed from the design data used for forming a pattern of the photomask 101 serving as an inspection target workpiece can be used, and alternatively, data prepared separately may be used. Operation contents performed by the resizing unit 52 are the same as those in Embodiment 1 other than the above point.

The optical filter (PSF) 56 inputs the design image data after resizing, and convolves the design image data with the optical model function f shown by the equation (1). Operation contents performed by the PSF 56 are the same as those in Embodiment 1 other than the above point. Then, as well as Embodiment 1, the coefficient acquisition unit 142 acquires the coefficient $a_{i,j}$ of the optical model function f by calculating the equation (3) by using the sample optical image data and the design image data which is convolved by the optical model function f.

The reference circuit 112 generates reference image data corresponding to the actual optical image data of the target workpiece to be inspected by using the coefficient $a_{i,j}$ of the obtained optical model function f. At this point, when creating a reference image in Embodiment 1, the region size indicated by each data of the reference image data at the time of the PSF 72 outputting is changed to the pixel size of the actual optical image data by using the N×N average down sampling filter 74 shown in FIG. 11. However, in Embodiment 2, since the resolution of the optical image obtained in the optical image acquisition unit 150 is increased to N times by the magnification lens 172, it is not necessary to change the region size by using the N×N average down sampling filter 74. Contents other than the above are the same as those in Embodiment 1.

According to Embodiment 2, as mentioned above, when acquiring optical image data, it is possible to make both the frequency conditions of the optical image data and design image data accord with each other by increasing the resolution of the optical image data itself to N times to be in accord with the resolution of the design image data. Thus, a highly precise optical model can be obtained. Detection of a pseudo defect can be reduced by using this optical model.

Embodiment 3

While frequency conditions of the design image data and the optical image data are made to accord with each other by performing a low-pass filtering for the design image data by using the LPF 54 in Embodiment 1, it is not limited thereto. In Embodiment 3, a configuration will be described in which both the frequency conditions are made to accord with each other by restoring high frequency components of the optical image data. The structure of the pattern inspection apparatus according to Embodiment 3 is the same as that of FIG. 1. Moreover, the main steps of the pattern inspection method are the same as those in FIG. 2.

Figure 14:
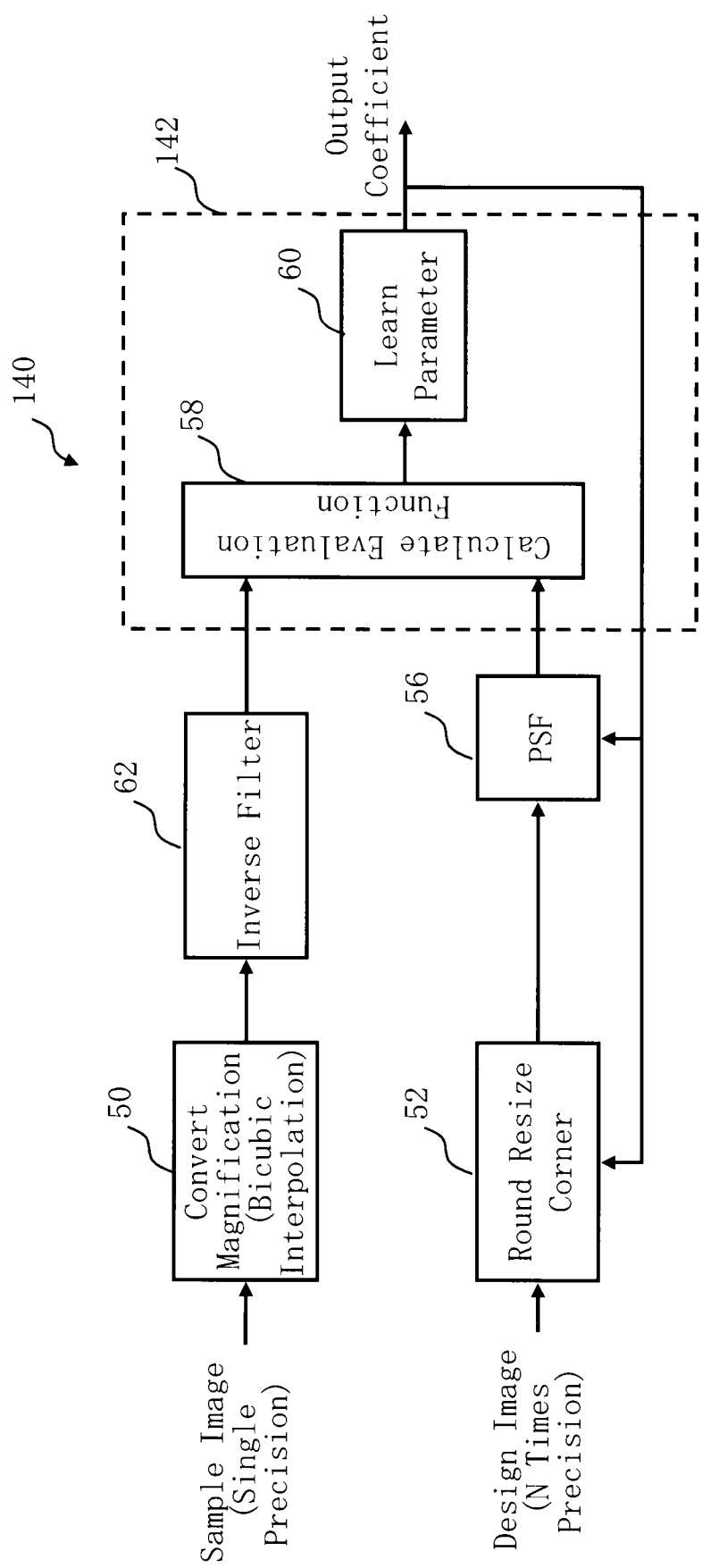
FIG. 14 is a block diagram showing the internal structure of a model coefficient estimation circuit according to Embodiment 3.

FIG. 14 is a block diagram showing the internal structure of a model coefficient estimation circuit according to Embodiment 3. FIG. 14 is the same as FIG. 4 except for the addition of an inverse filter 62 instead of the LPF 54. The structure and operations from inputting sample optical image data for learning to changing magnification by using the magnification conversion unit 50 are the same as those in Embodiment 1. Moreover, structures and operations up to the resizing processing by the resizing unit 52 are also the same as those in Embodiment 1.

The inverse filter 62 restores the high frequency components of the sample optical image data by inputting the sample optical image data (second sample optical image data) after the magnification changing, which has been lost through the changing, and convolving the input sample optical image data with an inverse filter function. Thereby, since the high frequency components have been restored in the sample optical image data after the restoration, the frequency condition of the sample optical image data becomes the same as that of the design image data. Therefore, the low-pass filtering processing by the LPF 54 can be omitted even with respect to the design image data.

The optical filter (PSF) 56 inputs the design image data after the resizing by the resizing unit 52, and convolves the design image data with the optical model function f shown by the equation (1). Operation contents performed by the PSF 56 are the same as those in Embodiment 1 other than the above point. As well as Embodiment 1, the coefficient acquisition unit 142 acquires the coefficient $a_{i,j}$ of the optical model function f by calculating the equation (3) by using the sample optical image data in which high frequency components have been restored and the design image data which has been convolved by the optical model function f. A suitable coefficient $a_{i,j}$ of the optical model function f is estimated by using the model coefficient estimation circuit 140. Each of subsequent steps after this is the same as that in Embodiment 1.

According to Embodiment 3, as mentioned above, it is possible to make both the frequency conditions of the optical image data and the design image data accord with each other by restoring the high frequency components of the optical image data, which have been lost through the magnification changing, by using the inverse filter. Thus, a highly precise optical model can be obtained. Detection of a pseudo defect can be reduced by using this optical model.

According to each Embodiment, as mentioned above, it is possible to make both the frequency conditions of the sample optical image and the design image data accord with each other when acquiring a coefficient of the optical model function. Thus, estimation of a coefficient by which a reference image being blurred compared to an actual image is generated can be prevented. Therefore, pseudo defects can be reduced. Thereby, effective use of the apparatus, such as preventing re-doing inspection, can be achieved.

What is represented by the word "unit", "circuit", or "step" in the description above can be configured by computer programs. They may be implemented by software programs executed by the computer system. Alternatively, they may be executed by a combination of software and hardware, or a combination of software, hardware and/or firmware. When constituted by a program, the program is stored in a recording medium, such as the magnetic disk drive 109, the magnetic tape drive 115, the FD 116, or the ROM (Read Only Memory). For example, the table control circuit 114, the development circuit 111, the reference circuit 112, the model coefficient estimation circuit 140, or the comparison circuit 108 which constitutes a calculation control unit may be configured by electric circuits. Alternatively, they may be executed as software to be processed by the control computer 110, or executed by a combination of electric circuits and software.

While the embodiments have been described with reference to specific examples, the present invention is not restricted to these specific ones. For example, although a transmitted light is used in each Embodiment, it is also preferable to use a reflected light, or to use them simultaneously. When using reflected lights, it should be understood that the size of a pixel value acquired from a transmissive portion and a pixel value acquired from a light-shielding portion shading unit is reverse.

While description of the apparatus structure, control method, etc. not directly required for explaining the present invention is omitted, some or all of them may be suitably selected and used when needed.

In addition, any other pattern inspection apparatus and pattern inspection method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection method comprising:
inputting first sample optical image data, and converting the first sample optical image data to second sample optical image data which has a resolution N times that of the first sample optical image data, and which has a higher resolution than the first sample optical image data;
inputting first design image data which has a resolution N times that of the first sample optical image data, and which has a higher resolution than the first sample optical image data, and in which a gray level value corresponding to the first sample optical image data is defined, and calculating second design image data by convolving the first design image data with a predetermined low-pass filtering function;
calculating third design image data by convolving the second design image data with a predetermined optical model function;
acquiring a coefficient of the predetermined optical model function by performing a predetermined calculation by using the second sample optical image data and the third design image data;
acquiring actual optical image data of an inspection target workpiece on which a pattern is formed;
generating reference image data corresponding to the actual optical image data of the inspection target workpiece by using the coefficient; and
inputting the actual optical image data, and comparing the actual optical image data with the reference image data to output a comparison result.

2. A non-transitory tangible computer-readable recording medium storing a program to be executed by a computer, the program comprising:

reading first sample optical image data stored in a storage device, and converting the first sample optical image data to second sample optical image data which has a resolution N times that of the first sample optical image data, and which has a higher resolution than the first sample optical image data;

inputting first design image data which has a resolution N times that of the first sample optical image data, and which has a higher resolution than the first sample optical image data, and in which a gray level value corresponding to the first sample optical image data is defined, and calculating second design image data by convolving the first design image data with a predetermined low-pass filtering function;

calculating third design image data by convolving the second design image data with a predetermined optical model function;

acquiring a coefficient of the predetermined optical model function by performing a predetermined calculation by using the second sample optical image data and the third design image data;

generating reference image data corresponding to actual optical image data of an inspection target workpiece, on which a pattern is formed, by using the coefficient; and inputting the actual optical image data, and comparing the actual optical image data with the reference image data to output a comparison result.

* * * * *